United States Patent

[11] 3,607,156

[72] Inventors Warren G. Schlinger
 Pasadena;
 William L. Slater, La Habra; Roger M. Dille, La Habra; Joseph P. Tassoney, Whittier, all of Calif.
[21] Appl. No. 787,191
[22] Filed Dec. 26, 1968
[45] Patented Sept. 21, 1971
[73] Assignee Texaco Inc.
 New York, N.Y.

[54] HYDROGEN AND CARBON MONOXIDE FROM SLURRIES OF SOLID CARBONIFEROUS FUELS
 7 Claims, No Drawings
[52] U.S. Cl. .................................................. 48/206,
 48/197, 48/200, 252/373
[51] Int. Cl. ......................................................... C01b 2/14,
 C10j 3/06, C10j 3/16
[50] Field of Search ........................................... 48/200,
 201, 202, 206, 197, 212, 215; 252/373, 376

[56] References Cited
 UNITED STATES PATENTS
 2,864,677 12/1958 Eastman et al. ............... 48/206
 2,904,417 9/1959 TeNuyl ......................... 48/206 X
 2,928,460 3/1960 Eastman et al. ............... 122/6.5
 2,946,670 7/1960 Whaley ......................... 48/206

Primary Examiner—Joseph Scovronek
Attorneys—K. E. Kavanagh and Thomas H. Whaley

ABSTRACT: Production of synthesis gas from a slurry of particulate solid carboniferous fuel e.g., petroleum coke, coke from bituminous coal, coal, oil shale, tar sands, pitch, or mixtures of said solid fuels in water or in a hydrocarbon liquid fuel. Pumpable slurries containing 1–60 weight percent of ground solid carboniferous fuel in petroleum oil and 25–55 weight percent of ground solid carboniferous fuel in water at a relatively low velocity in the range of 5 to 50 feet per second is mixed with a stream of oxidizing gas at a relatively high velocity in the range of 200 feet per second to sonic velocity at the burner tip to form an atomized dispersion of water, hydrocarbon liquid fuel, oxidizing gas and particulate solid carboniferous fuel. Under synthesis gas generating conditions the atomized dispersion is reacted to produce a gaseous mixture of hydrogen and carbon monoxide. By this process, slurry feeds of low cost solid carboniferous fuels may be gasified without being preheated.

HYDROGEN AND CARBON MONOXIDE FROM SLURRIES OF SOLID CARBONIFEROUS FUELS

BACKGROUND OF THE INVENTION

1 Field of the Invention

This invention relates to the production of synthesis gas. More particularly, it relates to improvements in the partial oxidation process for generating hydrogen and carbon monoxide by utilizing as feedstock atomized dispersions of liquid slurries of solid carboniferous fuels.

2. Description of the Prior Art

Synthesis gas, a mixture of carbon monoxide and hydrogen, is usually made by the partial oxidation of gaseous or liquid hydrocarbons by means of an oxidizing gas such as air, oxygen (95 mole percent or more) or oxygen-enriched air (40 mole percent $O_2$ or more). The raw synthesis gas leaving the unpacked noncatalytic reaction zone of the synthesis gas generator at a temperature in the range of about 1,800° to 3,200° F. comprises principally CO and $H_2$ together with minor amounts of $H_2O$, $CO_2$, $CH_4$, , $H_2S$, and free particulate carbon or soot. For a more complete description of the synthesis gas process, refer to U.S. Pat. No. 2,809,104 issued to Dale M. Strasser, et al.

Synthesis gas mixtures are important commercially as a source of hydrogen for hydrogenation reactions, and as a source of feed gas for the synthesis of hydrocarbons, oxygen-containing organic compounds, or ammonia.

The gaseous and liquid hydrocarbon fuels used in conventional processes for manufacturing synthesis gas include methane, propane, naphtha, crude oil, and vacuum residuum. Heavy oils are usually atomized and mixed with superheated steam in a tubular furnace, and the resulting fuel-steam mixture is then mixed with an oxidizing gas in a burner. Previous to our invention many processing problems made impractical the gasification of slurries of solid carboniferous fuels. For example, preheating the slurry feed in a tubular furnace was troublesome as solids would plug the furnace tubing during vaporization of the slurry. Plugging the tubing might occur even with dilute slurries having a solids content of 1 to 4 weight percent. Although by diluting slurries one might improve their pumpability, this is undesirable since dilution adds excessive amounts of water to the generator. Further, it was found that the surface area of the particulate carbon formed in the synthesis gas process is related to the $H_2O$-to-fuel ratio, and excess $H_2O$ caused problems in the carbon-recovery system.

Since our invention requires substantially no preheating, the aforesaid plugging difficulties are eliminated and slurries with greater solids contents (1 to 60 weight percent) may be used as feed, thereby reducing considerably the quantity of $H_2O$ fed to the synthesis gas generator.

SUMMARY

By the process of our invention a slurry of particulate carboniferous fuel, e.g., petroleum coke, coke from bituminous coal, coal, oil shale, tar sands, pitch, or mixtures of these materials in a liquid vehicle selected from the group comprising water, a hydrocarbon liquid fuel, or a mixture of these liquids is passed through the inner conduit of an annulus-type burner at a relatively low velocity of 5 to 50 feet per second. Simultaneously, at a relatively high velocity in the range of from 200 feet per second to sonic velocity at the burner tip, a converging atomizing stream of oxidizing gas is passed through a concentric annular passage in the burner. The two streams meet in front of the burner face which is located inside of the reaction zone of an unpacked noncatalytic synthesis gas generator. There they mix and form an atomized dispersion of water, hydrocarbon liquid fuel, oxidizing gas, and particulate solid carboniferous fuel. If desired the water may be introduced into the burner as steam mixed with the oxidizing gas or as a liquid vehicle for the solid fuel. Under synthesis gas generating conditions, the atomized dispersion is reacted to produce a gaseous mixture of hydrogen and carbon monoxide.

By the process of our invention, low cost solid carboniferous fuels may be gasified in a synthesis gas generator without being preheated.

It is therefore a principal object of the present invention to improve the economy and efficiency of the continuous partial oxidation process for producing large volumes of synthesis gas comprising principally hydrogen and carbon monoxide and containing controlled amounts of particulate carbon.

Another object of the invention is to utilize directly as feedstock in the partial oxidation process for producing synthesis gas liquid slurries of low cost solid carboniferous fuels containing a high solids content.

A still further object of the invention is to react liquid slurries of solid carboniferous fuels with an oxidizing gas in a novel manner which avoids preheating the slurry and which produces superior results upon gasification.

DESCRIPTION OF THE INVENTION

The gasification of liquid slurries of solid carboniferous fuels (containing about 1 to 60 weight percent of solids) may be accomplished in accordance with the process of our invention using an annulus-type burner, for example as shown in the drawing of coassigned U.S. Pat. No. 2,928,460 issued to DuBois Eastman, Charles P. Marion, and William L. Slater. The front end of the annulus-type burner assembly, as shown in FIG. 2 of said drawing, is inserted into the compact, unpacked, noncatalytic reaction zone of a synthesis gas generator of the type described in U.S. Pat. No. 2,980,523 issued to R. M. Dille et al. The front end of said burner comprises an inner conduit 10, through which the liquid-solid slurry may be passed, surrounded by an annular passage 15 through which an oxidizing gas or an oxidizing gas-steam mixture may be passed. In preparing the liquid-solid slurry, the liquid vehicle for the solid carboniferous fuel may be water or a hydrocarbon liquid or a mixture of both. Pumpable slurries containing 1–60 weight percent of ground solid carboniferous fuel in petroleum oil and 25–55 weight percent of ground solid carboniferous fuel in water are preferred. When the liquid vehicle is water, steam need not be mixed with the oxidizing gas. The oxidizing gas may be air, oxygen-enriched air (more than 40 mole percent $O_2$), or pure oxygen (more than 95 mole percent $O_2$).

Near the tip of the burner said annular passage converges inwardly in the shape of a hollow, right cone, as shown in FIG. 2 of U.S. Pat. No. 2,928,460. The oxidizing gas or oxidizing gas-steam mixture is thereby accelerated and discharged from the burner as a high velocity conical stream having an apex angle in the range of about 30° to 45°. The streams from the burner converge at a point located about 0–6 inches beyond the burner face. The high velocity stream of oxidizing gas hits the relatively low velocity stream of liquid-solid slurry, atomizing it and forming a fine mist comprising minute particles of water, hydrocarbon liquid fuel, and particulate solid carboniferous fuel highly dispersed in said oxidizing gas. The particles of solid carboniferous matter impinge against one another and are fragmented further. The velocity of the slurry is in the range of 5 to 50 feet per second and the velocity of the oxidizing gas is greater than 100 feet per second and preferably at a velocity in the range of 200 feet per second to sonic velocity at the burner tip.

While this discussion was based on a burner and feed stream arrangement as previously described, it is understood that the feed to the burner may be reversed. That is in another embodiment of our invention, the liquid-solid slurry may be passed through the annular passage 15 while the oxidizing gas or oxidizing gas-steam mixture is passed through the inner conduit 10.

Partial oxidation of the feed takes place in the reaction zone of the synthesis gas generator at a temperature in the range of about 1,800° to 3,500° F. and at a pressure in the range of about 100 to 3,000 p.s.i.g. The atomic ratio of free oxygen to carbon in the feed is a value in the range of 0.70 to 1.2 and the weight ratio of water to fuel present in the reaction zone is a value in the range of 0.2 to 3.0. The composition of the effluent stream of synthesis gas leaving the generator expressed as mole percent dry basis is as follows: $H_2$ 30 to 49, CO 35 to 55, $CO_2$ 7 to 25, $CH_4$ 0.1 to 8.0, COS + $H_2S$ 0.1 to 2.0, and soot + unconverted coke 1 to 20.

The process of the invention, as just described, requires no preheat for the reactants. However, if desired the oxidizing gas or the oxidizing gas-steam mixture may be heated to a temperature in the range of about 100° to 600° F. to reduce oxygen consumption. Similarly, the slurry may be heated to a temperature in the range of about 100° to 300° F., but below the vaporization temperature of the liquid vehicle, to reduce the viscosity of the slurry and to improve its pumpability.

Although our invention is described hereinafter in particular with reference to petroleum coke, as previously stated it is applicable to other solid carboniferous fuels including coal, coke from bituminous coal, oil shale, tar sands, pitch, and the like.

Petroleum coke is comprised in general of minute graphitelike crystals imbedded in an organic matrix of highly condensed aromatic compounds such as anthracene, phenanthracene, chyrsene, picene and crackene. Petroleum coke suitable for use as a starting material in the process of this invention may be produced by the "delayed coking" process, a special process for converting heavy residual fuel oil into gasoline, gas oil, and coke or by other petroleum-coking processes that reduce a petroleum coke having a similar structure and chemical analysis. The solid carboniferous residue remaining after the high temperature distillation of moisture and volatile matter from bituminous coal is also known by the name coke and may be also gasified in the manner taught by the process of our invention. Typical analyses of petroleum coke and coke from bituminous coal in weight percent follow:

|  | Petroleum Coke | Bituminous Coal Coke |
| --- | --- | --- |
| Volatiles | 4–7 | 0.5–4.6 |
| Fixed Carbon | 92–96 | 76–95 |
| Ash | 0.2–1.3 | 0.5–20 |
| Sulfur | 0.5–5.0 | 0.5–5.0 |
| $H_2O$ | 0 | 0.5–5.0 |
| True Density, g./ml. | 1.3–1.6 | 1.3–1.8 |
| Oil Absorption No. | <1.0 | <1.0 |

The carboniferous solid fuel is pulverized to a particle size so that 60%–95% passes through a 325-mesh screen by any suitable standard procedure, e.g., U.S. Pat. No. 2,846,150 issued to Lincoln T. Work. The small size of the solid fuel particle is important to assure a uniform suspension in the liquid vehicle which will not settle out, to allow sufficient motion relative to the gaseous reactants, to assure substantially complete gasification, and to provide pumpable slurries of high solids content with a minimum of grinding.

Atomizable liquid vehicles which are suitable for the preparation of the suspension include water, coal oil, shale oil, gasoline, kerosene, naphtha, gas oil fractions of petroleum distillate, benzene, toluene, hexane, heptane, cyclohexane, tetralin, decalin, fuel oil, residual fuel oil, reduced crude oil, whole crude oil, and mixtures of these various liquids. Also, water and hydrocarbon liquid fuel mixtures, suitably in the form of emulsions with an emulsifying agent or with a gelling agent such as pectins may be used in preparing the liquid-solid carboniferous fuel slurry.

EXAMPLE OF THE PREFERRED EMBODIMENT

The following example is offered as a better understanding of the present invention, but the invention is not to be construed as limited thereto.

1,186.5 pounds of petroleum coke prepared from reduced crude oil by the "delayed coking" process is ground to −325-mesh and mixed with 1,186.5 pounds of 12° API gravity crude oil. An analysis of the coke and crude oil is shown below in Table I. 2,373 lbs./hr. of the resulting slurry containing 50 percent by weight of solids is pumped at a rate of 25 ft./sec. and at a temperature of 100° F. through the central passage of an annulus-type burner as shown in FIG. 2 of the aforesaid U.S. Pat. No. 2,928,460. The burner is mounted in the top head of a compact, unpacked, noncatalytic 16.0 CF synthesis gas generator in the manner shown in FIG. 1 of U.S. Pat. No. 2,980,523. 1,186 lbs./hr. of steam and 2,524 lbs./hr. of oxygen (100 mole percent) are combined and at a rate of 350 ft./sec. and at a temperature of 425° F. are introduced into the annular passage of said burner. 109,277 SCFH of synthesis gas is produced in the gas generator from the ensuing partial oxidation reaction at a temperature of 2,490° F. and at a pressure of 550 p.s.i.g. An analysis of the product gas follows: In mole percent dry basis: $H_2$ 40.3, CO 51.1, $CO_2$ 7.8, $H_2S$ 0.2, and soot + unconverted coke 3.8.

TABLE I - FEED TO GENERATOR

| Element | Oil | Petroleum Coke | Slurry Feed |
| --- | --- | --- | --- |
| C | 87.43 wt. % | 91.47 wt. % | 89.45 wt. % |
| H | 10.41 wt. % | 3.75 wt. % | 7.08 wt. % |
| N | 0.77 wt. % | 2.75 wt. % | 1.76 wt. % |
| Ash | 0.11 wt. % | 0.43 wt. % | 0.27 wt. % |
| S | 1.27 wt. % | 1.60 wt. % | 1.44 wt. % |
| Ni | 67 ppm. | 533 ppm. | 300 ppm. |
| V | 60 ppm. | 640 ppm. | 350 ppm. |

A summary of the performance date follows:

| | |
| --- | --- |
| Oxygen/Fuel Ratio, s.c.f./lb. | 12.62 |
| Water/Fuel Ratio, lb./lb. | 0.50 |
| Oxygen/Carbon Ratio, atom/atom | 0.893 |
| Oxygen Consumption, s.c.f./M s.c.f. $H_2$+CO | 299.71 |
| Gas Velocity, ft./sec., gen. exit | 46.52 |
| Residence Time, sec. | 3.22 |
| $O_2$/Fuel, moles per MM B.t.u. | 2.00 |
| Heat of Combustion, B.t.u./lb. | 16,615 |
| Cold Gas efficiency | 81.6 |

The process of the invention has been described generally and by examples with reference to liquid-solid carboniferous fuel slurries and synthesis gas of particular compositions for purposes of clarity and illustration only. It will be apparent to those skilled in the art from the foregoing that various modifications of the process and materials disclosed herein can be made without departure from the spirit of the invention

We claim:

1. A partial oxidation process for producing synthesis gas which comprises:
    1. mixing particulate solid carboniferous fuel with a liquid vehicle selected from the group consisting of water, hydrocarbon liquid fuel, and mixtures thereof to form a pumpable slurry comprising 1–60 weight percent of solids when said liquid vehicle is hydrocarbon liquid fuel and 25–55 weight percent of solids when said liquid vehicle is water;
    2. atomizing the slurry of (1) within the reaction zone of a synthesis gas generator by contacting therein a stream of said slurry at a relatively low velocity in the range of 5 to 50 feet per second with a stream of oxidizing gas at a relatively high velocity in the range of 100 feet per second to sonic velocity and selected from the group consisting of air, oxygen, oxygen-enriched air, and mixtures of steam and one of said oxidizing gases to form an atomized dispersion in which the ratio of atoms of oxygen to atoms of carbon is in the range of 0.7 to 1.2 and the weight ratio of $H_2O$ to fuel is in the range of 0.2 to 3.0; and 3. reacting the atomized dispersion of (2) in said reaction zone at a temperature in the range of 1,800° to 3,500° F. and a pressure in the range of 100 to 3,000 p.s.i.g.

2. The process of claim 1 wherein said solid carboniferous fuel is selected from the group consisting of petroleum coke, coal, coke made from bituminous coal, oil shale, tar sands, pitch, and mixtures of said materials.

3. The process of claim 1 wherein the atomizing of (2) is effected by passing said stream of slurry at a velocity of 5 to 50 feet per second through the inner conduit of an annulus-type burner in said reaction zone and contacting said stream with said stream of oxidizing gas passing at a velocity in the range of 200 feet per second to sonic velocity at the burner tip through the annular passage of said burner.

4. The process of claim 1 wherein the atomizing of (2) is effected by passing said stream of oxidizing gas at a velocity in the range of 200 feet per second to sonic velocity at the burner tip through the inner conduit of an annulus-type burner in said reaction zone and contacting said stream with a stream of said slurry passing at a velocity of 5 to 50 feet per second through the annular passage of said burner.

5. The process of claim 1 wherein said hydrocarbon liquid fuel is selected from the group consisting of gasoline, naphtha, residual fuel oil, reduced crude oil, whole crude oil, shale oil, coal oil, and tar sand oil.

6. The process of claim 1 wherein said solid carboniferous fuel is petroleum coke in which 60–95 weight percent passes through 325 mesh screen and said hydrocarbon liquid fuel is residual fuel oil.

7. A process for the gasification of solid carboniferous fuel which comprises:

1. pulverizing a solid carboniferous fuel selected from the group consisting of petroleum coke, oil shale, coal, coke produced from bituminous coal, pitch, and mixtures of said materials;

2. mixing the particulate solid carboniferous fuel of (1) with a liquid vehicle selected from the group consisting of water, gasoline, naphtha, residual fuel oil, reduced crude oil, whole crude oil, coal oil, shale oil, tar sand oil, and mixtures of said liquid vehicles to form a pumpable slurry comprising 1–60 weight percent of solids;

3. passing a stream of the slurry of (2) at a temperature in the range of about 100 to 300° F. and at a relatively low velocity in the range of 5 to 50 feet per second through the inner conduit of a burner discharging into the reaction zone of a synthesis gas generator and having an annular passage and passing a stream of oxidizing gas at a temperature in the range of about 100 to 600° F. selected from the group consisting of air, oxygen-enriched air, oxygen, and mixtures of steam and one of said oxidizing gases through the annular passage of said burner at a relatively high velocity in the range of 100 feet per second to sonic velocity;

4. contacting said streams in said reaction zone to produce an atomized dispersion of said liquid vehicle, oxidizing gas, particulate solid carboniferous fuel, and steam in which the ratio of atoms of oxygen to atoms of carbon is in the range of 0.7 to 1.2 and the weight ratio of $H_2O$ to fuel present is in the range of 0.2 to 3.0; and 5. reacting the atomized dispersion of (4) in said reaction zone at a temperature in the range of 1800° to 3,500° F. and a pressure in the range of 100 to 3,000 p.s.i.g. to produce a stream of synthesis gas.